Feb. 1, 1944.  J. DUSEVOIR  2,340,458
ENGINE CRANKSHAFT
Filed June 18, 1943
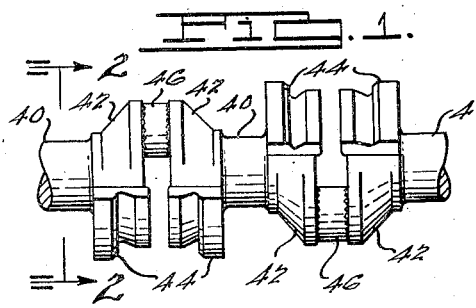
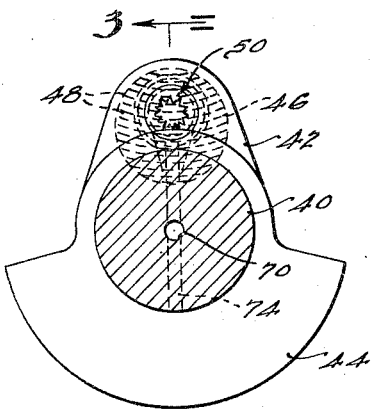
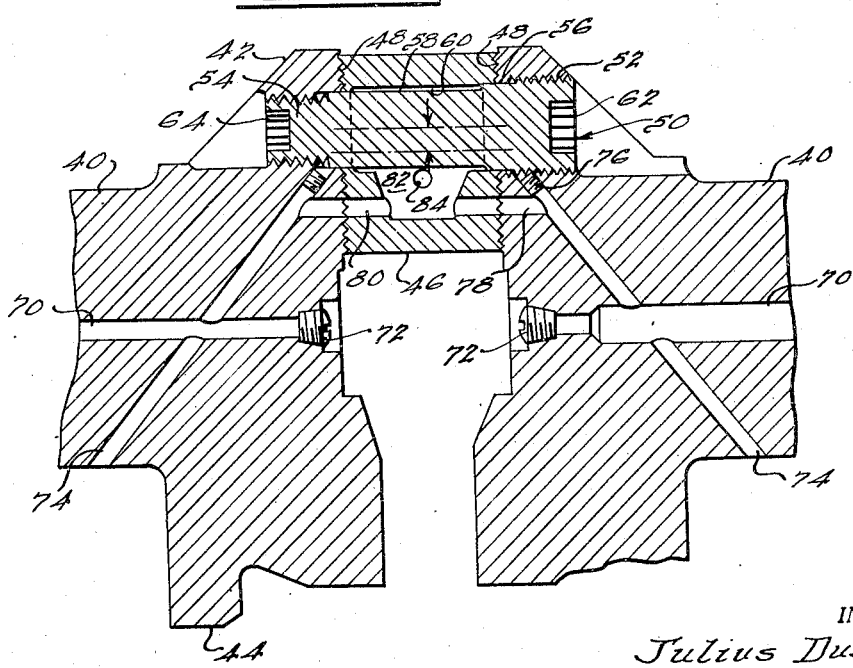
INVENTOR.
Julius Dusevoir.
BY
Harness, Dickey & Pierce.

Patented Feb. 1, 1944

2,340,458

UNITED STATES PATENT OFFICE 2,340,458

ENGINE CRANKSHAFT

Julius Dusevoir, Dearborn, Mich., assignor to Century Motors Corporation, Dearborn, Mich., a corporation of Michigan Application June 18, 1943, Serial No. 491,324

6 Claims. (Cl. 74—597)

This invention relates to built up crankshafts for use in internal combustion or other engines, compressors or the like, and is a continuation in part of my application for Letters Patent of the United States for improvements in Engine crankshaft construction, filed July 27, 1942, and serially numbered 452,412.

Objects of the invention include the provision of a built up crankshaft in which the journals and the crank pins are formed separately from the throws thereof and the journals partially overlap the throws when viewed axially of the crankshaft, and a threaded element is provided extending between adjacent pairs of throws and through the intervening crank pin or journals to clamp the latter between the former, such thread element being located radially outwardly of the axis of the crankshaft with respect to the axis of the corresponding crank pins; and the provision of a construction as above described in which the threaded element comprises a differentially threaded screw cooperating with the throws and crank pin in a new and novel manner.

The above being among the objects of the present invention the same consists in certain novel details of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Fig. 1 is a fragmentary, side elevational view of a crankshaft;

Fig. 2 is an enlarged cross-sectional view of the crankshaft shown in Fig. 1 taken on the line 2—2 thereof; and, Fig. 3 is an enlarged fragmentary sectional view taken axially through two of the journals and one of the crank pins of the crankshaft shown in the preceding views, as on the line 3—3 of Fig. 2.

In built up crankshafts as heretofore proposed it has been conventional practice to project screw means between the throws and axially of a crank pin received therebetween in order to removably secure all of these parts together into a rigid unit. In some modern internal combustion engines in particular the relative diameters of the journals and the crank pins have been increased to such an extent as compared to the radial distance between the axis of a crank pin and the axes of the journals that the crank pins and journals overlap in axial view to such an extent that it is impossible to locate bolts, studs, or other securing means of the required diameter centrally of the crank pin for the purpose of clamping it between adjacent throws, and it has heretofore been thought that such types of crankshafts were not amenable to being formed as built up crankshafts.

It is therefore, the principal object of the present invention to provide a crankshaft of the type above described in which the crank pins are formed separately from the throws and are removably secured therebetween. This is accomplished in accordance with the present invention by locating the securing screw means in eccentric relation with respect to the axis of the crank pin and radially outwardly of such axis with respect to the axes of the journals, and so constructing the abutting faces of the pins and throws as to prevent relative rotation of the pin with respect to the throws. Such construction is particularly useful where the abutting faces of the pins and throws are suitably serrated for inter-engaging relationship with respect to each other so as not only to prohibit relative turning of the pins with respect to the throws but also to interlock these parts against lateral movement in at least one direction. In such case it is preferable, although not essential in the broader aspects of the invention, to so form the securing means as to provide pilot portions received in corresponding openings of the pin and throws to prevent relative movement of the crank pin in any direction radially with respect to the axis of the securing means or of the axis of the crank pin itself. The form of securing means comprising a differentially threaded stud or bolt shown and claimed in my co-pending application for Letters Patent of the United States for improvements in Connection, filed June 18, 1943, and serially numbered 491,323, is especially suitable for use in a crankshaft constructed in accordance with the present invention for the reason that the security of the connection is greatly enhanced as compared to conventional means as heretofore employed.

Referring now to the accompanying drawing a crankshaft is shown comprising main journals 40 having throws 42 formed integrally therewith, the throws being provided with conventional counterbalancing portion 44 formed integrally therewith. Between each successive pair of throws 42 a separately formed crank pin or journal member 46 is interposed. In the broader aspects of the present invention the particular manner in which the crank pin journal 46 and throws 42 are formed for cooperation with one another to prevent relative rotation of one of the throws with respect to the other about the axis of the crank pin is more or less unimportant. In the particular construction shown the opposite ends of the crank pin 46 are arranged in planes perpendicular to the axis thereof and such end faces and the opposed face areas of the throws 42 are provided with serrations 48 arranged in complementary and interengaging relationship with respect to each other. The serrations at each end of each pin 46, both in the pin and in the cooperating throw are struck from a common center lying outwardly of the axis of the pin 46, as indicated in Fig. 2, and in the same general manner as shown and claimed in my United States Patent No. 2,013,039, issued September 3, 1935, on Crankshaft, and more particularly in accordance with the disclosure in my co-pending application for Letters Patent of the United States for improvements in Crankshaft, filed September 1, 1942, and serially numbered 456,843.

It will be particularly observed from an inspection of Figs. 2 and 3 that the diameters of the journals 40 and the pin 46 are so large with respect to the distance which the axis of the pin 46 is located from the axis of the journals 40 that it would be impossible to project a bolt, stud or the like of a sufficient size to accomplish the desired purpose through the pin 46 in axially concentric relation therewith. In fact the axis of the crank pin 46 is seen to be barely outside of a cylinder concentric with the axis of the crankshaft and including the surfaces of the journals 40 so that it would be impossible to employ a bolt, stud or other securing means of the required diameter located on such axis to clamp the crank pin between the throws.

Accordingly, because of this condition, in accordance with the present invention a stud, indicated generally at 50, is projected between cooperating pairs of throws 42 and through the intervening crank pin 46 but is arranged with its axis offset radially outwardly from the axes of the journals 40 from the axis of the pin 46. In order that the stud 50 will be effective for its desired purpose in rigidly clamping the crank pin 46 between the throws 42 with sufficient force to prevent any undesirable movement between these parts regardless of the eccentric relation of the pin 46 and stud 50, the stud 50 is of special construction and cooperates with the throws 42 and pin 46 in a particular way.

Referring to Fig. 3 it will be noted that the stud 50 comprises a threaded end portion 52 and an opposite threaded end portion 54 of smaller diameter than the portion 52 and that these threaded portions 52 and 54 are connected together by an unthreaded portion of substantially greater axial length than the diameter of the larger threaded end portion 52. The threaded end portion 52 threads into the righthand throw 42 as viewed in Fig. 3 while the threaded end portion 54 threads into the lefthand throw 42 and the stud 50 has no threaded connection with the pin 46 in any respect. In the broader aspects of the invention as long as the threaded end 52 is provided with threads of finer pitch than the threads on the end 54, and the threads on the end 54 are of an outside diameter no greater and preferably less than the root diameter of the threads on the end 52, this is all that is required as far as the clamping effect of the stud 50 in clamping the pin 46 between the throws 42 in concerned. Preferably, however, and in accordance with a more limited phase of the present invention the stud 50 is formed to provide pilot means between the ends of the pin 46 and the cooperating throws 42.

In order to provide this last effect the stud 50 immediately inwardly of the threaded end 52 is provided with a concentric cylindrical portion 46 arranged to bridge the joint between the righthand end of the pin 46 and the righthand throw 42, and the corresponding portions of the bores in the pin and throw are formed to closely receive the same as shown. This serves to prevent any lateral displacement between the pin 46 and the righthand throw 42. The cylindrical portion 46 is of a diameter no greater than the root diameter of the threads on the end portion 52 so as to enable it to be projected through the threaded portion of the bore in the righthand throw 42. Likewise immediately inwardly of the threaded end portion 54 the stud 50 is formed to provide a concentric cylindrical portion 58 and the lefthand throw 42 and lefthand end of the pin 46 are provided with short unthreaded bore portions on either side of the joint between the pin 46 and the lefthand throw 42 for close reception of such cylindrical portion 58 to prevent lateral displacement between the pin 46 and the lefthand throw 42. The bore in the pin 46 between the end portions thereof formed for reception of the portion 56 and 58 of the stud 50 is relieved as at 60 to provide clearance between it and the central portion of the stud. The diameter of the portion 58 is, of course, at least equal to and preferably slightly greater than the outside diameter of the threads on the end 54 and, of course, smaller than the diameter of the portion 56, so that the stud 50 may be projected from the right as viewed in Fig. 3 into cooperating relationship with all of these parts as will be apparent.

In accordance with the present invention the pitch of the threads on the end 52 of the stud 50 is less than the pitch of the threads on the end 54 so as to provide a differentially threaded stud. The advantage of using this differentially threaded feature is that threads of a material size may be employed which will effectively eliminate possibility of stripping under the severe shearing force to which they are subjected when the stud 50 is drawn home to rigidly clamp the crank pin 46 between the throws 42, and yet the same mechanical advantage is obtained that would result from using a stud of conventional construction having fine threads of a pitch equivalent to the effective pitch of the differentially threaded studs. Furthermore, for reasons which will be hereafter more fully explained, due to the particular construction of the stud 50 shown and described the need of employing lock washers, lock nuts or other locking means to prevent possible loosening up of the stud 50 in service is effectively eliminated, thus materially simplifying the construction and enhancing the ease with which the various parts of the crankshaft may be assembled and disassembled with respect to each other.

In order to illustrate the mechanical advantage of employing the differentially threaded screw 50 let it be assumed as a matter of illustration that the threads on the end 52 are sixteen to the inch and those on the end 54 are twelve to the inch. In such case the effective pitch of the entire stud in drawing together the throws 42 to clamp the pin 46 between them is the difference between the number of threads per inch at the two ends of the stud, namely, four, multiplied by the number of the coarser threads per inch, namely twelve, or forty-eight threads per inch. From this it will be appreciated that, by this construction, a great mechanical advantage is obtained over a construction in which the threads are identical throughout and yet are of a sufficient size to be practical in service. As a result it is possible to clamp the separately formed pin 46 between the throws 42 with such a great force that despite the eccentric relation of the stud 50 with respect to the axis of the pin 46 a structure is provided which is as fully practical as though the stud 50 was located concentrically with the pin 46.

It will be appreciated that in assembling the pin 46 between the throws 42 the stud 50 is first threaded part way into the righthand throw 42 as viewed in Fig. 3, the pin 46 is slipped over it, the lefthand throw 42 is then engaged upon the lefthand end 54 of the stud 50, upon which further turning of the stud 50 to thread it into the righthand throw 42 will also thread it into the lefthand throw 42 and because of the difference in pitch of the threads on the ends 52 and 54 as the stud 50 is threaded into the two throws, the two throws will be drawn one toward the other until they securely clamp the pin 46 between them in the position shown.

I have found, as brought out in my co-pending application on connection above identified, that by employing a differentially threaded screw, such as the stud 50 shown, to clamp together two or more parts, such as the throws 42 and the crank pin 46, which are held against relative rotation with respect to each other by means in addition to the clamping force of the screw, as for instance through the interengagement of the serrations 16 in the case shown, and where the central portion of the screw is free of threaded engagement with the cooperating parts for a distance at least as great as the diameter of the large end of the screw, then when the screw is drawn up tight to clamp the connected parts together, it has the inherent characteristic of locking itself in place with such security as to eliminate the need of any additional locking means such as set screws, lock nuts, lock wire, or the like. This is for the reason that in so being drawn up tight the central portion of the screw, equivalent to the central portion of the stud 50 shown, is, of course, placed under an axial tension. Consequently any attempt to turn the screw from either one end or the other thereof places the central portion of the screw under of torsion tending to further shorten it and increasing the frictional engagement of the threads at its opposite ends with the threads in the connected parts, which automatically has the effect of further increasing the clamping force exerted by the screw and increasing its locking effect in the associated parts. In fact it has been found that once such screw has been securely drawn up into place it is a physical impossibility to remove it by a turning force applied to one end only thereof and that the only possible way that the stud may be removed from the work is to apply a turning force to both ends of the screw. Accordingly, the stud 50 which constitutes such differentially threaded screw in the present case is provided with a wrench receiving socket 62 at one end thereof and a wrench receiving socket 64 at the opposite end thereof so that once the stud has been assembled as shown and securely drawn into place it may only be thereafter removed for the purpose of disassembling the crankshaft, or at least permitting the removal of one of the pins 46 and the cooperating end of the associated connecting rod (not shown) which surrounds it, by simultaneously applying a turning force in the same direction to both ends of the stud.

Experience has shown that this automatic locking effect of the stud 50 in the throws 42 occurs whether the stud is drawn up by pressure applied from one end only or from both ends, in either case it being impossible to remove it by a turning force applied to one end only if the stud 50 has been drawn up tightly in the first instance.

From the foregoing it will be appreciated that by the use of the differentially threaded stud 50 with the central portion thereof free of threaded engagement with the work for a distance at least equal to the diameter of the large end 52, it is possible to clamp the pin 46 between the throws 42 with sufficient force to prevent any possible yielding at the joint between these parts regardless of the eccentric relationship of the stud 50 with respect to the axis of the pin 46 and at the same time it eliminates the necessity of utilizing any separate locking means to guard against possibility of inadvertent loosening up of the stud 50 in service.

The construction shown in the drawing illustrates the convenience with which lubrication channels may be provided in such construction. In other words, the journals 40 are provided with central oil passages 70 which extend through the ends of the throws and are there plugged as at 72. Angularly extending passages 74 conduct lubricant from the central passages 70 to the surfaces of the journals 40. Continuations of such passages 74 lead to the threaded bores in the throws 42 for reception of the stud 50, but these are plugged adjacent the threaded bore, as at 76, and are connected by a passage 78, parallel to the axis of the crankshaft, with the serrated face thereof. The crank pin 46 is provided with a passage 80 therein which is aligned with the passages 78 and not only serves to connect the passages 74 in the journals 40 but, through a pocket 82, located centrally of the journal 36 and a cross-passage 84, serves to conduct lubricant to the surface of the crank pin 46.

Having thus described my invention what I claim by Letters Patent is:

What I claim is:

1. In a built-up crankshaft, in combination, a pair of separately formed throw members, a separately formed journal member interposed between said throw members, said throw members and said journal member having aligned openings therethrough outwardly offset from the center of said journal member with respect to the axis of rotation of said crankshaft, a screw element axially slidably received in said opening in said journal member and having its opposite ends threadably engaged in said throw members, the threads on one end of said screw element being of the same hand as the threads on the opposite end thereof but of a pitch different therefrom.

2. In a built-up crankshaft, in combination, a pair of separately formed throw members, a separately formed journal member interposed between said throw members, the abutting faces of said journal member and said throw members being serrated and the serrations of each pair of abutting faces interfitting one another, said throw members and said journal member having aligned openings therethrough outwardly offset from the center of said journal member with respect to the axis of rotation of said crankshaft, and a screw element axially slidably received in said opening in said journal member and having its opposite ends threadably engaged in said throw members, the threads on one end of said screw element being of the same hand as the threads on the opposite end thereof but of a pitch different therefrom.

3. In a built-up crankshaft, in combination, a pair of main journals, a throw fixed with respect to each of said main journals, a separately formed crank pin interposed between said throws with its end faces in abutting relation with respect thereto, said abutting faces having interfitting serrations formed thereon, the throw dimension of said crankshaft being less than the sum of the radii of one of said journals and said crank pin, whereby said main journals and said crank pin overlap in view axially of the crankshaft, said throws and said crank pin having aligned openings therethrough eccentric to the axis of said crank pin and outwardly offset from the axis thereof with respect to the axis of said crankshaft, and a screw element axially received in said opening in said crank pin and having its opposite end threadably received in said openings of said throws, the threads on one end of said screw element being of the same hand as the threads on the opposite end thereof but of a pitch different therefrom.

4. In a built-up crankshaft, in combination, a pair of main journals, a throw fixed with respect to each of said main journals, a separately formed crank pin interposed between said throws with its end faces in abutting relation with respect thereto, said abutting faces having interfitting serrations formed thereon, the throw dimension of said crankshaft being less than the sum of the radii of one of said journals and said crank pin, whereby said main journals and said crank pin overlap in view axially of the crankshaft, said throws and said crank pin having aligned openings therethrough eccentric to the axis of said crank pin and outwardly offset from the axis thereof with respect to the axis of said crankshaft, a screw element axially slidably received in said opening in said crankpin and having its opposite end threadably received in said openings of said throw, the threads on one end of said screw element being of the same hand as the threads on the opposite end thereof but of a pitch different therefrom, and both ends of said screw element being formed for reception of a wrench.

5. In a built-up crankshaft, in combination, a pair of separately formed throw members, a separately formed journal member interposed between said throw members, the abutting faces of said journal member and said throw members being serrated and the serrations of each pair of abutting faces interfitting one another, said throw members and said journal member having aligned openings therethrough outwardly offset from the center of said journal member with respect to the axis of rotation of said crankshaft, a screw element axially slidably received in said opening in said journal member and having its opposite ends threadably engaged in said throw members, the threads on one end of said screw element being of the same hand as the threads on the opposite end thereof but of a pitch different therefrom, and concentric cylindrical portions on said screw element closely received in complementary bores in said journal member and said throw members at and adjacent the abutting faces thereof, whereby said cylindrical portions form pilots serving to accurately locate said journal member with respect to said throw members.

6. In a built-up crankshaft, in combination, a pair of separately formed throw members, a separately formed journal member interposed between said throw members, said throw members and said journal member having aligned openings therethrough outwardly offset from the center of said journal member with respect to the axis of rotation of said crankshaft, and a screw element axially slidably received in said opening in said journal member and having its opposite ends threaded and cooperating with said throw members to clamp said journal member therebetween.

JULIUS DUSEVOIR.